(12) United States Patent
Yeh et al.

(10) Patent No.: US 10,374,418 B2
(45) Date of Patent: Aug. 6, 2019

(54) CIRCUIT AND METHOD FOR ELECTROSTATIC DISCHARGE CLAMPING

(71) Applicant: INDUSTRIAL TECHNOLOGY RESEARCH INSTITUTE, Hsinchu (TW)

(72) Inventors: Chih-Ting Yeh, Hsinchu County (TW); Yung-Chih Liang, New Taipei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 970 days.

(21) Appl. No.: 14/563,385

(22) Filed: Dec. 8, 2014

(65) Prior Publication Data

US 2015/0288172 A1   Oct. 8, 2015

(30) Foreign Application Priority Data

Apr. 3, 2014 (TW) .............................. 103112623 A (51) Int. Cl.
    *H02H 9/04* (2006.01)
(52) U.S. Cl.
    CPC .................... *H02H 9/046* (2013.01)
(58) Field of Classification Search
    CPC ................ H02H 9/046; H02H 9/04; H01L 27/0248–0296
    See application file for complete search history.

(56) References Cited

U.S. PATENT DOCUMENTS

| 6,075,686 A | 6/2000 | Ker |
|---|---|---|
| 7,110,228 B2 | 9/2006 | Chang |
| (Continued) | | |

FOREIGN PATENT DOCUMENTS

| TW | 200541043 A | 12/2005 |
|---|---|---|
| TW | 201340522 A | 10/2013 |

OTHER PUBLICATIONS

Hsiang-Pin Hung et al., Abnormal ESD damages occur in interface circuits between different power domains in ND-mode MM ESD stress, Proceedings of 13th IPFA, 2006, 163-166, Singapore.
(Continued)

*Primary Examiner* — Ronald W Leja
*Assistant Examiner* — Christopher J Clark
(74) *Attorney, Agent, or Firm* — Locke Lord LLP; Tim Tingkang Xia, Esq.

(57) ABSTRACT

A circuit and a method for electrostatic discharge clamping are provided. The circuit includes a detection module, a control module, and a clamping module. The detection, control, and clamping modules are coupled with a first power line of a first power source and a second power line of the first power source. Third terminals of the detection, control and clamping modules are coupled to a first power line of a second power source, a voltage division terminal of the detection module, a fourth terminal of the control module respectively. According to an electrostatic discharge event on the first power line of the first power source, the division voltage terminal of the detection module provides a voltage to the control module. Then, the control module controls the clamping module to couple the first power line of the first power source to the second power line of the first power source.

7 Claims, 5 Drawing Sheets

(56) References Cited

U.S. PATENT DOCUMENTS

| | | | |
|---|---|---|---|
| 7,446,991 B2* | 11/2008 | Chen | H01L 27/0285 361/56 |
| 7,626,790 B2 | 12/2009 | Hung | |
| 8,373,956 B2* | 2/2013 | Abou-Khalil | H02H 9/046 361/118 |
| 9,025,289 B1* | 5/2015 | Peng | H02H 9/046 361/118 |
| 2007/0103825 A1 | 5/2007 | Ker et al. | |
| 2011/0032648 A1 | 2/2011 | Darthenay et al. | |
| 2012/0281322 A1 | 11/2012 | Pugsley et al. | |
| 2013/0148243 A1* | 6/2013 | Tsujikawa | H02H 9/044 361/56 |
| 2013/0155554 A1* | 6/2013 | Wang | H02H 9/046 361/56 |

OTHER PUBLICATIONS

Shih-Hung Chen et al., Active ESD protection design for interface circuits between separated power domains against cross-power-domain ESD stresses, IEEE Transactions on Device and Materials Reliability, 2008, 549-560, vol. 8, No. 3.

Mototsugu Okushima, ESD protection design for mixed-power domains in 90nm CMOS with new efficient power clamp and GND current trigger (GCT) technique, EOS/ESD Symposium 06-205-06-213, 4A. 6-1-6-9, 2006.

Ming-Dou Ker et al., ESD protection design to overcome internal damage on interface circuits of a CMOS IC with multiple separated power pins, IEEE Transactions on Components and Packaging Technologies, 2004, 445-451, vol. 27, No. 3.

Ming-Dou Ker et al., ESD protection design to overcome internal damages on interface circuits of CMOS IC with multiple separated power pins, IEEE, 2002, 234-238.

Ming-Dou Ker et al., Whole-chip ESD protection strategy for CMOS IC's with multiple mixed-voltage power pins, IEEE, 1999, 298-301.

Intellectual Property Office, Ministry of Economic Affairs, R.O.C., "Office Action", dated Jun. 2, 2015, Taiwan.

* cited by examiner

CIRCUIT AND METHOD FOR ELECTROSTATIC DISCHARGE CLAMPING

CROSS-REFERENCE TO RELATED APPLICATIONS

This non-provisional application claims priority under 35 U.S.C. § 119(a) on Patent Application No(s). 103112623 filed in Taiwan, R.O.C. on Apr. 3, 2014, the entire contents of which are hereby incorporated by reference.

TECHNICAL FIELD

The disclosure relates to a circuit and a method for electrostatic discharge clamping based on different power sources.

BACKGROUND

Since the development of portable electronic products focus on the features of light weight, small size and multifunctional integration, the two-dimensional integrated circuits (2D IC) design nowadays cannot meet the needs in the field. Thus, the three-dimensional integrated circuit (3D IC) design, integrating two or more chips into a single one vertically, has been developed. By through silicon via (TSV), the 3D IC design has a short distance of signal transmission and a small area and can integrate heterogeneous chips together to reach high system integration. Furthermore, to meet the needs of emerging application and multifunctional integration, multiple power sources may be employed in the 3D IC design in the future. However, it is seldom for the full-chip electrostatic discharge protection structure with a multi-power module nowadays to teach different detection ways to enhance the turned-on behaviors of the clamping circuit in multiple power sources applications.

SUMMARY

According to one or more embodiments, the disclosure provides a circuit for electrostatic discharge clamping. In one embodiment, the circuit may comprise a detection module, a control module, and a clamping module. The detection module may be coupled with a first power line of a first power source and a second power line of the first power source. A third terminal of the detection module may be coupled to a first power line of a second power source. The control module may be coupled with the first power line of the first power source and the second power line of the first power source. A third terminal of the control module may be coupled to a voltage division terminal of the detection module. The clamping module may be coupled with the first power line of the first power source and the second power line of the first power source. A third terminal of the clamping module may be coupled to a fourth terminal of the control module. The voltage division terminal may provide a voltage to the control module according to an electrostatic discharge event on the first power line of the first power source, and the control module may then control the clamping module to couple the first power line of the first power source to the second power line of the first power source.

According to one or more embodiments, the disclosure provides a method for electrostatic discharge clamping. In one embodiment, the method may include the following steps. First, a voltage on a voltage division terminal of a detection module may be generated according to an electrostatic discharge event on a first power line of a first power source. Second, the voltage may be provided to a control module for controlling a clamping module. A third terminal of the detection module may be coupled to a first power line of a second power source, and when the control module is driven by the voltage to control the clamping module to be in an on state, the first power line of the first power source may be coupled to a second power line of the first power source.

BRIEF DESCRIPTION OF THE DRAWINGS

The disclosure will become more fully understood from the detailed description given herein below for illustration only and thus does not limit the disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
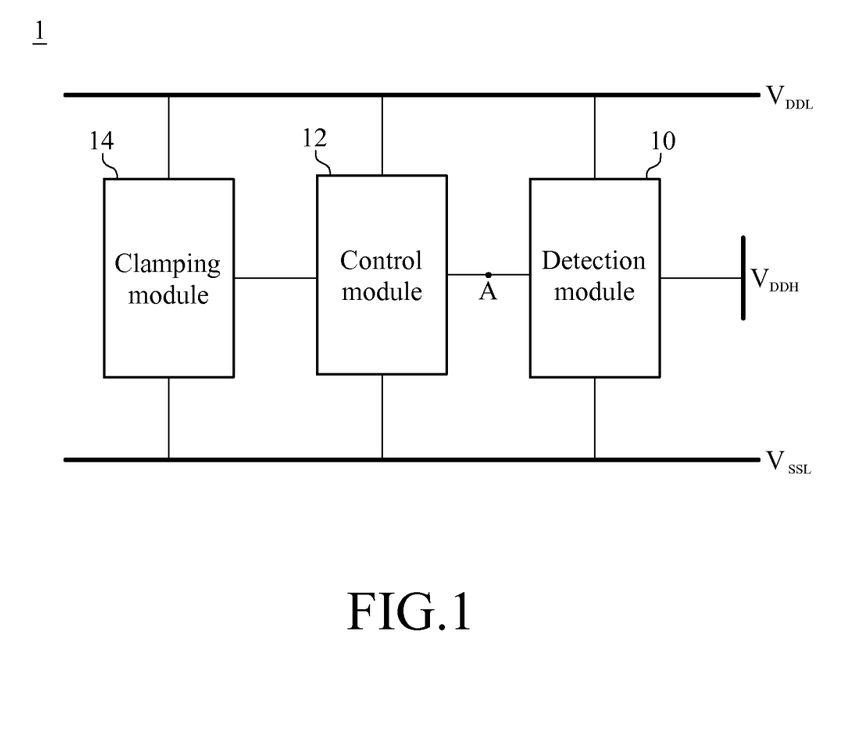
FIG. 1 illustrates a function block diagram of an embodiment of a circuit for electrostatic discharge clamping in the disclosure.

Please refer to FIG. 1, FIG. 1 illustrates a function block diagram of an embodiment of a circuit for electrostatic discharge clamping in the disclosure. As shown in FIG. 1, the circuit 1 for electrostatic discharge clamping includes a detection module 10, a control module 12, and a clamping module 14. The control module 12 is coupled with the detection module 10 and the clamping module 14. The detection module 10 is coupled with a first power line $V_{DDL}$ of a first power source, a second power line $V_{SSL}$ of the first power source, and a first power line $V_{DDH}$ of a second power source. Specifically, a third terminal of the detection module 10 is coupled to the first power line $V_{DDH}$ of the second power source. The control module 12 and the clamping module 14 both are coupled with the first power line $V_{DDL}$ of the first power source and the second power line $V_{SSL}$ of the first power source. In practice, the circuit 1 is capable of detecting electrostatic discharge events on the first power line $V_{DDL}$ of the first power source and provides an appropriate discharge path in a system with multiple power sources. Accordingly, other inner elements in the system are protected against electrostatic discharging.

In one or more embodiments, the detection module 10 includes a voltage division terminal A. The voltage division terminal A provides a voltage to the control module 12 according to an electrostatic discharge event on the first power line $V_{DDL}$ of the first power source, and the control module 12 then controls the clamping module 14 to couple the first power line $V_{DDL}$ of the first power source to the second power line $V_{SSL}$ of the first power source. In one embodiment, the voltage on the first power line $V_{DDL}$ of the first power source and the voltage on the first power line $V_{DDH}$ of the second power source are different to each other. For example, the voltage on the first power line $V_{DDH}$ of the second power source is higher than that on the first power line $V_{DDL}$ of the first power source. Alternately, the voltage on the first power line $V_{DDH}$ of the second power source is lower than that on the first power line $V_{DDL}$ of the first power source. In another embodiment, the voltage on the first power line $V_{DDL}$ of the first power source and the voltage on the first power line $V_{DDH}$ of the second power source are the same such that the first power line $V_{DDL}$ of the first power source and the first power line $V_{DDH}$ of the second power source can be protected from the noise and the operation of dynamic voltage. On the other hand, in one embodiment, a power isolating unit such as an inverse-parallel diode pair (or called anti-parallel diode pair) is used for protecting the second power line $V_{SSL}$ of the first power source and a second power line $V_{SSH}$ of the second power source from noise interference. In another embodiment, the second power line $V_{SSL}$ of the first power source and the second power line $V_{SSH}$ of the second power source are connected with each other.

In practice, the voltage division terminal A is coupled to a third terminal of the control module 12. The control module 12 is controlled by the voltage on the voltage division terminal A to generate a control signal correspondingly. In an embodiment, the voltage division terminal A is a node in the circuit 1 and corresponds to any node of the detection module 10 as long as the voltage on the voltage division terminal A is capable of controlling the control module 12.

The clamping module 14 determines whether to couple the first power line $V_{DDL}$ of the first power source to the second power line $V_{SSL}$ of the first power source, according to the control signal. In practice, when the electrostatic discharge event occurs, the detection module 10 drives the control module 12 to fast control the clamping module 14 to provide an electrostatic discharge path which is generated by coupling the first power line $V_{DDL}$ of the first power source to the second power line $V_{SSL}$ of the first power source. Thus, other inner elements can be protected against electrostatic discharging.

In the above case that the electrostatic discharge event occurs on the first power line $V_{DDL}$ of the first power source, the majority logic of the circuit 1 is readily accomplished with any possible circuit design for similar functions and principles by a person having ordinary knowledge in the art. Nevertheless, to describe the disclosure clearly, some exemplary circuit designs are provided below.

Figure 2:
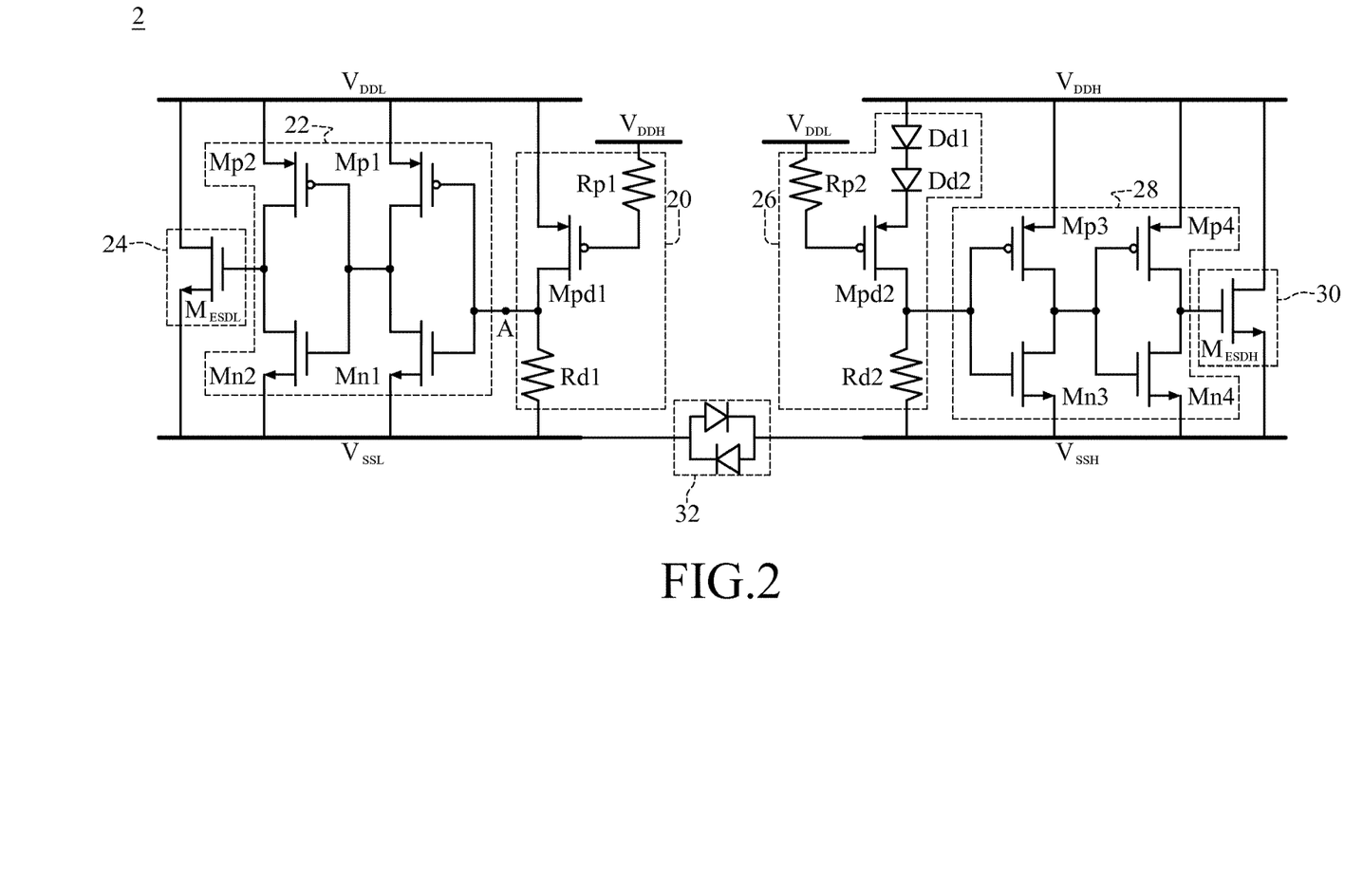
FIG. 2 illustrates a circuit diagram of an embodiment of a circuit for electrostatic discharge clamping in the disclosure.

Please refer to FIG. 2, FIG. 2 illustrates a circuit diagram of an embodiment of a circuit for electrostatic discharge clamping in the disclosure. Compared with the circuit 1 shown in FIG. 1, the circuit 2 for electrostatic discharge clamping is carried out based on a first power source at the left side and a second power source at the right side. In other words, the circuit 2 carries out the detection of electrostatic discharge events and the provision of appropriate discharge paths in an environment with different power sources.

As shown in FIG. 2, the circuit 2 for electrostatic discharge clamping is, for example, a resistive-divider clamping circuit for electrostatic discharge. The circuit 2 includes a detection module 20, a control module 22, and a clamping module 24 at the first power source side and includes a detection module 26, a control module 28, and a clamping module 30 at the second power source side. In practice, for isolating the noise, a second power line $V_{SSL}$ of the first power source is not necessarily connected with a second power line $V_{SSH}$ of the second power source directly. However, when an electrostatic discharge event occurs, a low resistance path shall be provided to release a current caused by the electrostatic discharge event. Accordingly, the circuit 2 further includes a power isolating unit 32 connected with the second power line $V_{SSL}$ of the first power source and the second power line $V_{SSH}$ of the second power source. Because the detection module 20, the control module 22, and the clamping module 24 at the first power source side are similar to the detection module 26, the control module 28, and the clamping module 30 at the second power source side on functions, the following description will focus on the detection module 20, the control module 22, and the clamping module 24 at the first power source side.

In an embodiment, the detection module 20 includes a transistor Mpd1, a resistor Rp1, and a resistor Rd1. For example, the transistor Mpd1 is a P-type field effect transistor. Alternately, the transistor Mpd1 is a N-type field effect transistor, a bipolar junction transistor (BJT), or any possible component. A P-type field effect transistor is taken for the following exemplary description of the circuit 2, and however, any circuit design for a N-type field effect transistor or a bipolar junction transistor can also be employed to replace the circuit 2 in FIG. 2 by a person having ordinary knowledge in the art and thus is not repeated hereinafter. A control terminal (i.e. a third terminal) of the transistor Mpd1 is coupled to a first power line $V_{DDH}$ of the second power source through the resistor Rp1. A first terminal of the transistor Mpd1 is coupled to a first power line $V_{DDL}$ of the first power source. A second terminal of the transistor Mpd1 is coupled to the second power line $V_{SSL}$ of the first power source through the resistor Rp1. In practice, the transistor Mpd1 and the resistor Rp1 cooperate with each other to be a resistive voltage divider.

Similarly, the detection module 26 includes a transistor Mpd2, a resistor Rp2, and a resistor Rd2. A control terminal (i.e. a third terminal) of the transistor Mpd2 is coupled to the first power line $V_{DDL}$ of the first power source through the resistor Rp2. A first terminal of the transistor Mpd2 is coupled to the first power line $V_{DDH}$ of the second power source through a diode Dd1 and a diode Dd2. A second terminal of the transistor Mpd2 is coupled to the second power line $V_{SSH}$ of the second power source through the resistor Rd2. Under normal circuit operation, a voltage on the first power line $V_{DDH}$ of the second power source is higher than that on the first power line $V_{DDL}$ of the first power source. To avoid the transistor Mpd2 being on, the first terminal of the transistor Mpd2 is connected with one or more diodes in series, thereby decreasing the voltage difference between the first terminal and the third terminal of the transistor Mpd2. In practice, the resistor Rp1 and the resistor Rp2 can protect the transistor Mpd1 and the transistor Mpd2 against electrostatic discharging.

The control module 22 includes two inverters which are connected in series. The first inverter includes a pair of transistors with opposite polarities (i.e. a transistor Mp1 and a transistor Mn1), and the second inverter includes a pair of transistors with opposite polarities (i.e. a transistor Mp2 and a transistor Mn2). An input terminal of the first inverter is coupled to the second terminal of the transistor Mpd1. In the embodiment, the second terminal of the transistor Mpd1 is the voltage division terminal A. Additionally, an output terminal of the second inverter is coupled to a third terminal of the clamping module 24.

Furthermore, the clamping module 24 is, for example, a transistor $M_{ESDL}$. The output terminal of the second inverter is coupled to a third terminal of the transistor $M_{ESDL}$. A second terminal of the transistor $M_{ESDL}$ is coupled to the first power line $V_{DDL}$ of the first power source, and a first terminal of the transistor $M_{ESDL}$ is coupled to the second power line $V_{SSL}$ of the first power source.

In practice, when the electrostatic discharge event occurs, an electrostatic discharge current may enter into the circuit 2 through the first power line $V_{DDL}$ of the first power source. Then, the voltage difference between the third terminal and the first terminal of the transistor Mpd1 is higher than a turned-on voltage in the detection module 20, so that the transistor Mpd1 is on. Accordingly, the voltage on the voltage division terminal A is at a high voltage level. Then, the transistor Mn1 is on in the control module 22 whereby the voltage on an output terminal of the first inverter drops to be at a low voltage level (close to the voltage on the second power line $V_{SSL}$ of the first power source). Accordingly, the transistor Mp2 is on in the control module 22 to pull up the voltage on the output terminal of the second inverter to be at a high voltage level (close to the voltage on the first power line $V_{DDL}$ of the first power source).

When the voltage on the output terminal of the second inverter increases to be at the high voltage level, then this voltage is set as a control signal to control the clamping module 24. Accordingly, if the voltage on the output terminal of the second inverter increases to be at the high voltage level, the transistor $M_{ESDL}$ is on to provide an electrostatic discharge path from the first power line $V_{DDL}$ of the first power source to the second power line $V_{SSL}$ of the first power source. This similar way can be applied to the second power source side of the circuit 2 and it will not be repeated hereinafter.

Figure 3:
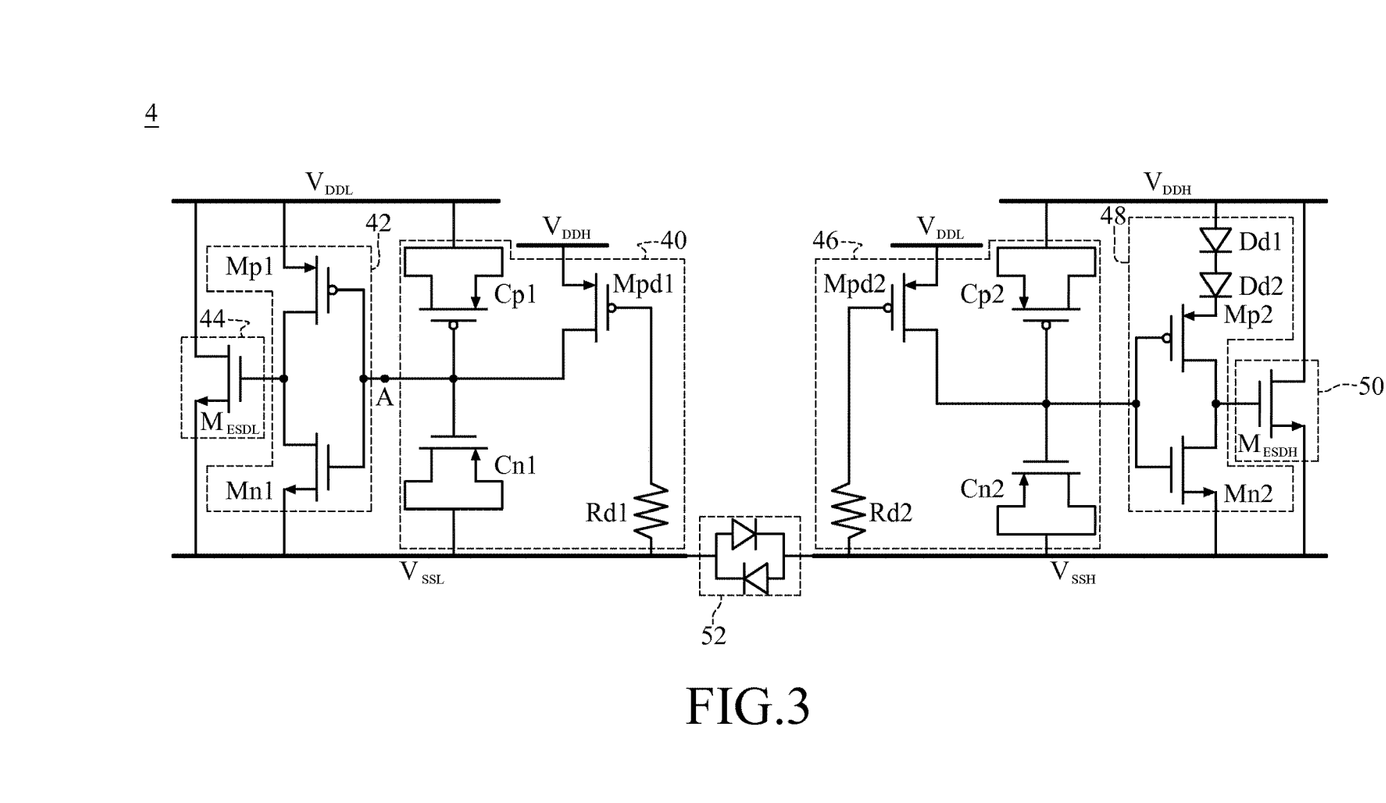
FIG. 3 illustrates a circuit diagram of another embodiment of a circuit for electrostatic discharge clamping in the disclosure.

Please refer to FIG. 3. FIG. 3 illustrates a circuit diagram of another embodiment of a circuit for electrostatic discharge clamping in the disclosure. As shown in FIG. 3, the circuit 4 for electrostatic discharge clamping is, for example, a capacitive-divider clamping circuit for electrostatic discharge. The circuit 4 includes a detection module 40, a control module 42, and a clamping module 44 at a first power source side and includes a detection module 46, a control module 48, and a clamping module 50 at a second power source side. The same as the circuit 2 in FIG. 2, the circuit 4 can further include a power isolating unit 52 connected with a second power line $V_{SSL}$ of the first power source and a second power line $V_{SSH}$ of the second power source.

In the embodiment, the detection module 40 includes a transistor Mpd1, a resistor Rd1, a capacitor Cp1, and a capacitor Cn1. The transistor Mpd1 also takes a P-type field effect transistor for an example. A control terminal (i.e. a third terminal) of the transistor Mpd1 is coupled to the second power line $V_{SSL}$ of the first power source through the resistor Rd1. A first terminal of the transistor Mpd1 is coupled to a first power line $V_{HDH}$ of the second power source. A second terminal of the transistor Mpd1 is coupled to a voltage division terminal A. The capacitor Cp1 has two terminals respectively coupled with the voltage division terminal A and a first power line $V_{DRL}$ of the first power source. The capacitor Cn1 has two terminals respectively coupled with the voltage division terminal A and the second power line $V_{SSL}$ of the first power source. The capacitor Cp1 and the capacitor Cn1 are carried out by, for example, an equivalent component generated by transistors whose source terminal and drain terminal are coupled to each other. In some embodiments, the capacitor Cp1 and the capacitor Cn1 can be replaced with other similar components by a person having ordinary knowledge in the art. In practice, the resistor Rd1 can protect the transistor Mpd1 from damaging when the electrostatic discharge event occurs.

The control module 42 includes an inverter which includes a pair of transistors with opposite polarities (i.e. a transistor Mp1 and a transistor Mn1). An input terminal of the inverter is coupled to the second terminal of the transistor Mpd1. In the embodiment, the second terminal of the transistor Mpd1 is the voltage division terminal A. To be noticed, a first terminal of a transistor Mp2 in the control module 48 is connected with the first power line $V_{HDH}$ of the second power source through a diode Dd1 and a diode Dd2 connected in series. Under normal circuit operation, the voltage on the first power line $V_{DDH}$ of the second power source is higher than that on the first power line $V_{DDL}$ of the first power source. Herein, to prevent the transistor Mp2 from being on any time, the first terminal of the transistor Mp2 is connected with one or more diodes in series, thereby decreasing a voltage difference between the first terminal and a third terminal of the transistor Mp2.

Additionally, an output terminal of the inverter in control module 42 is coupled to a control terminal of the clamping module 44. In detail, the clamping module 44 is, for example, a transistor $M_{ESDL}$. The output terminal of the inverter in the control module 42 is coupled to a third terminal (i.e. a control terminal) of the transistor $M_{ESDL}$. A second terminal of the transistor $M_{ESDL}$ is coupled to the first power line $V_{DDL}$ of the first power source. A first terminal of the transistor $M_{ESDL}$ is coupled to the second power line $V_{SSL}$ of the first power source.

In practice, when the electrostatic discharge event occurs, an electrostatic discharge current may enter into the circuit 4 through the first power line $V_{DDL}$ of the first power source. Then, the voltages of the third terminal and the first terminal of the transistor Mpd1 are approximately the same (that is, the third terminal and the first terminal of the transistor Mpd1 are floating) in the detection module 40, so that the transistor Mpd1 is off. Accordingly, the voltage on the voltage division terminal A depends on the voltage division between the first power line $V_{DDL}$ of the first power source and the second power line $V_{SSL}$ of the first power source. Since the capacitance value of the capacitor Cp1 is lower than that of the capacitor Cn1 in the capacitor design, the voltage on the voltage division terminal A in the detection module 40 is at a lower voltage level.

Then, the transistor Mp1 is on and makes the output terminal of the inverter have a high voltage level because a voltage difference between a third terminal and a first terminal of the transistor Mp1 is higher than a turned-on voltage. Accordingly, the voltage on the output terminal of the inverter is pulled up to be at the high voltage level. Herein, the transistor $M_{ESDL}$ of the clamping module 44 becomes on to provide an electrostatic discharge path from the first power line $V_{DDL}$ of the first power source to the second power line $V_{SSL}$ of the first power source.

On the other hand, since the detection module 40, the control module 42, and the clamping module 44 at the first power source side are similar to the detection module 46, the control module 48, and the clamping module 50 at the second power source side on functions, the inner components and operation of the detection module 46, the control module 48 and the clamping module 50 can be referred to those of the detection module 40, the control module 42 and the clamping module 44 and are not repeated hereinafter.

Figure 4:
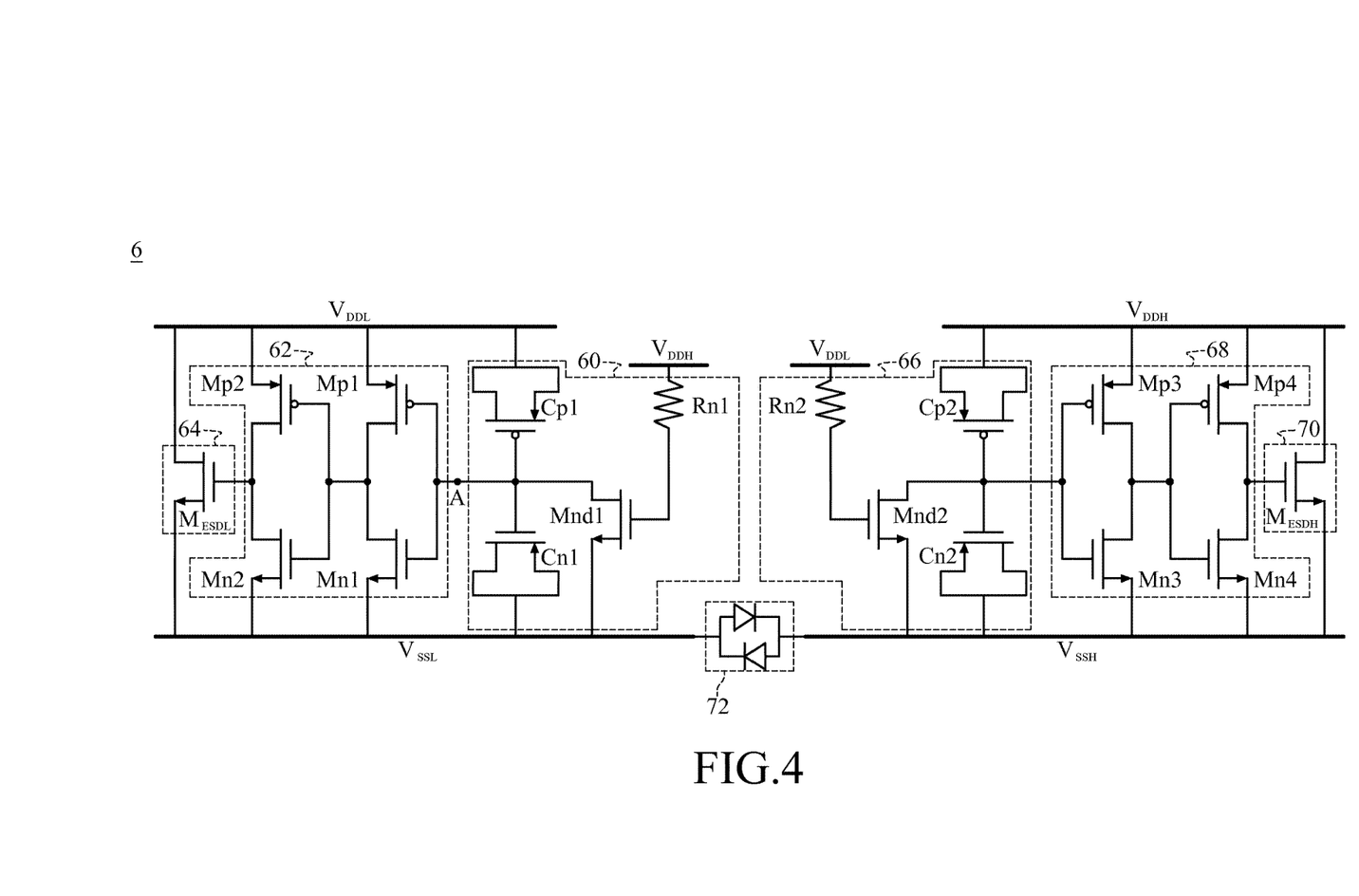
FIG. 4 illustrates a circuit diagram of another embodiment of a circuit for electrostatic discharge clamping in the disclosure.

Please refer to FIG. 4. FIG. 4 illustrates a circuit diagram of another embodiment of a circuit for electrostatic discharge clamping in the disclosure. As shown in FIG. 4, the circuit 6 for electrostatic discharge clamping is another capacitive-divider clamping circuit for electrostatic discharge. The circuit 6 includes a detection module 60, a control module 62, and a clamping module 64 at a first power source side and includes a detection module 66, a control module 68, and a clamping module 70 at a second power source side. The same as the circuit 4 in FIG. 3, the circuit 6 further includes a power isolating unit 72 connected with a second power line $V_{SSL}$ of the first power source and a second power line $V_{SSH}$ of the second power source.

The detection module 60 includes a transistor Mnd1, a resistor Rn1, a capacitor Cp1, and a capacitor Cn1. Different from the example in FIG. 3, the transistor Mnd1 takes a N-type field effect transistor for an example. A third terminal of the transistor Mnd1 is coupled to a first power line $V_{HDH}$ of the second power source through the resistor Rn1. A first terminal of the transistor Mnd1 is coupled to the second power line $V_{SSL}$ of the first power source. A second terminal of the transistor Mnd1 is coupled to a voltage division terminal A. The same as FIG. 3, the capacitor Cp1 has two terminals respectively coupled with the voltage division terminal A and a first power line $V_{DRL}$ of the first power source. The capacitor Cn1 has two terminals respectively coupled with the voltage division terminal A and the second power line $V_{SSL}$ of the first power source. The components in the circuit 6 which are similar to the relative components in FIG. 3 can be referred to the one or more embodiments in FIG. 3 and will not be repeated hereinafter.

The control module 62 includes two inverters which are connected with each other in series. The first inverter includes a pair of transistors with opposite polarities (i.e. a transistor Mp1 and a transistor Mn1), and the second inverter includes a pair of transistors with opposite polarities (i.e. a transistor Mp2 and a transistor Mn2). An input terminal of the first inverter is coupled to the second terminal of the transistor Mnd1. In the embodiment, the second terminal of the transistor Mnd1 is the voltage division terminal A. Additionally, an output terminal of the second inverter is coupled to a third terminal of the clamping module 64. Specifically, the clamping module 64 is, for example, a transistor $M_{ESDL}$. The output terminal of the second inverter is coupled to a third terminal (or called control terminal) of the transistor $M_{ESDL}$. A second terminal of the transistor $M_{ESDL}$ is coupled to the first power line $V_{DDL}$ of the first power source, and a first terminal of the transistor $M_{ESDL}$ is coupled to the second power line $V_{SSL}$ of the first power source.

In practice, when the electrostatic discharge event occurs, an electrostatic discharge current may enter into the circuit 6 through the first power line $V_{DDL}$ of the first power source. Then, the voltages on the third terminal and the first terminal of the transistor Mnd1 are approximately the same (that is, the third terminal and the first terminal of the transistor Mnd1 are floating) in the detection module 60, so that the transistor Mnd1 is off. Accordingly, the voltage on the voltage division terminal A depends on a voltage division between the first power line $V_{DDL}$ of the first power source and the second power line $V_{SSL}$ of the first power source. Since the capacitance value of the capacitor Cp1 is larger than the capacitance value of the capacitor Cn1, the voltage on the voltage division terminal A in the detection module 60 is at a higher voltage level.

When the voltage on voltage division terminal A is at the high voltage level, the transistor Mn1 in the control module 62 is on because a voltage difference between a third terminal and a first terminal of the transistor Mn1 is higher than a turned-on voltage. Herein, a voltage on the output terminal of the first inverter drops to be at a low voltage level. Then, the transistor Mp2 in the second inverter becomes on because a voltage difference between a third terminal and a first terminal of the transistor Mp2 is higher than the turned-on voltage. Herein, a voltage on the output terminal of the second inverter is pulled up to be at a high voltage level. Accordingly, the transistor $M_{ESDL}$ of the clamping module 64 becomes on to provide an electrostatic discharge path from the first power line $V_{DDL}$ of the first power source to the second power line $V_{SSL}$ of the first power source.

On the other hand, since the detection module 60, the control module 62, and the clamping module 64 at the first power source side are similar to the detection module 66, the control module 68, and the clamping module 70 at the second power source side on functions, the inner components and operation of the detection module 66, the control module 68 and the clamping module 70 can be referred to those of the detection module 60, the control module 62 and the clamping module 64 and are not repeated hereinafter.

Figure 5:
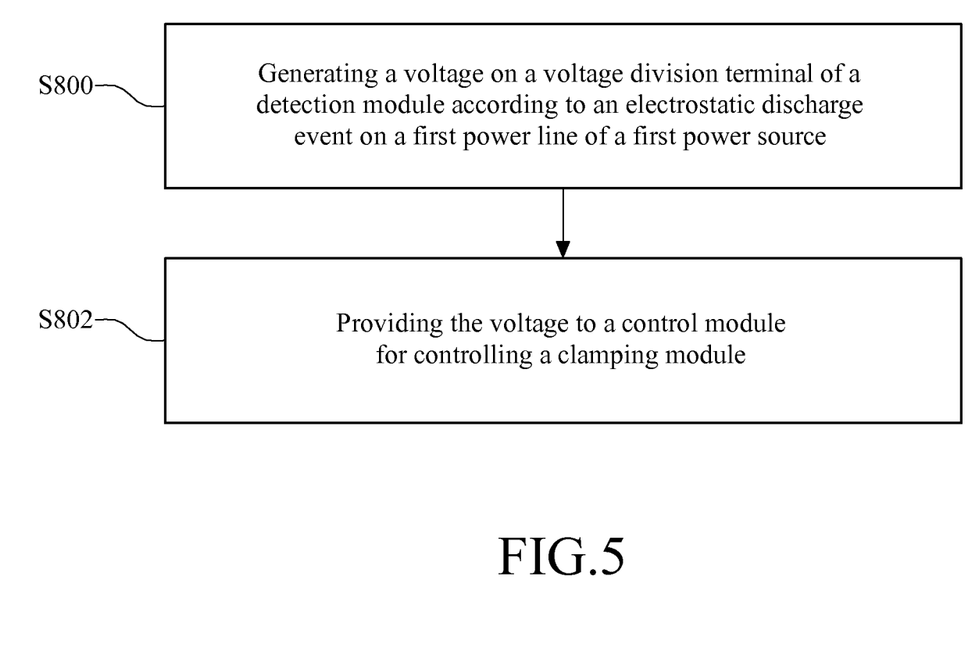
FIG. 5 illustrates a flow diagram of an embodiment of a method for electrostatic discharge clamping in the disclosure.

Please refer to FIG. 5. FIG. 5 illustrates a flow diagram of an embodiment of a method for electrostatic discharge clamping in the disclosure. In step S800, a voltage on a voltage division terminal of a detection module is generated according to an electrostatic discharge event on a first power line of a first power source. In step S802, the voltage is provided to a control module for controlling a clamping module. A third terminal of the detection module is coupled to a first power line of a second power source, and the control module is driven by the voltage to control the clamping module to be on and couples the first power line of the first power source to a second power line of the first power source. Additionally, an electrostatic discharge path is provided. The voltage division terminal of a detection module is formed by resistors or capacitors. The detection module, the control module, and the clamping module can be referred to the one or more embodiments in FIG. 1 to FIG. 4.

The disclosure employs a detection module for electrostatic discharge without any resistor-capacitor (RC) time constant in order to decrease the area of the circuit layout. According to the characteristic of the environment with different power sources and the operation of the different power sources, the circuit for electrostatic discharge clamping can be a resistive-divider or capacitor-divider clamping circuit. The circuit includes a clamping module, a detection module, and a control module. The disclosure detects the electrostatic discharge and then makes the clamping module be on without any RC time constant.

The disclosure will become more fully understood from the said embodiment for illustration only and thus does not limit the disclosure. Any modifications within the spirit and category of the disclosure fall in the scope of the disclosure.

What is claimed is:
1. A circuit for electrostatic discharge clamping, comprising:
   a detection module coupled with a first power line of a first power source and a second power line of the first power source, wherein a third terminal of the detection module is coupled to a first power line of a second power source;

a control module coupled with the first power line of the first power source and the second power line of the first power source, wherein a third terminal of the control module is directly connected to a voltage division terminal of the detection module, wherein the control module comprises two inverters respectively connected between the first and second power lines of the first power source, the two inverters respectively comprising a first pair of transistors with opposite polarities and a second pair of transistors with opposite polarities, gates of the first pair of transistors serve as the third terminal of the control module, and drains of the first pair of transistors are directly connected to gates of the second pair of transistors; and a clamping module coupled with the first power line of the first power source and the second power line of the first power source, wherein a third terminal of the clamping module is directly connected to a fourth terminal of the control module, wherein drains of the second pair of transistor serve as the fourth terminal of the control module;

wherein the voltage division terminal provides a voltage to the control module according to an electrostatic discharge event on the first power line of the first power source, and the control module then controls the clamping module to couple the first power line of the first power source to the second power line of the first power source;

wherein the detection module comprises at least one diode and a first transistor, a first terminal of the first transistor is coupled with the first power line of the first power source via said at least one diode, a second terminal of the first transistor is coupled to the voltage division terminal, and a third terminal of the first transistor is coupled to the first power line of the second power source.

2. The circuit according to claim 1, wherein the first transistor is a bipolar junction transistor or a field effect transistor.

3. The circuit according to claim 1, wherein the detection module further comprises a first resistor, a first terminal of the first resistor is coupled to the third terminal of the first transistor, and a second terminal of the first resistor is coupled to the first power line of the second power source.

4. The circuit according to claim 1, wherein the voltage division terminal is connected with a first terminal of a second resistor, and a second terminal of the second resistor is coupled to the second power line of the first power source.

5. The circuit according to claim 1, wherein the clamping module is a second transistor which is coupled with the first power line of the first power source and the second power line of the first power source, a third terminal of the second transistor is coupled to the fourth terminal of the control module, and the second transistor is controlled by the control module.

6. The circuit according to claim 5, wherein the detection module further comprises a second resistor, the voltage division terminal is coupled with a first terminal of the second resistor and a second terminal of the first transistor, and a second terminal of the second resistor is coupled with the second power line of the first power source; and when the electrostatic discharge event occurs, the first transistor is in an on state and cooperates with the second resistor, to perform voltage division, and after the control module controls the second transistor to be in an on state, the second transistor couples the first power line of the first power source to the second power line of the first power source.

7. A method for electrostatic discharge clamping, comprising the following steps:

generating a voltage on a voltage division terminal of a detection module according to an electrostatic discharge event on a first power line of a first power source; and providing the voltage to a control module for controlling a clamping module;

wherein a third terminal of the detection module is coupled to a first power line of a second power source, and when the control module is driven by the voltage to control the clamping module to be in an on state, the first power line of the first power source couples to a second power line of the first power source;

wherein the detection module comprises at least one diode and a first transistor, a first terminal of the first transistor is coupled with the first power line of the first power source via said at least one diode, a second terminal of the first transistor is coupled to the voltage division terminal, and a third terminal of the first transistor is coupled to the first power line of the second power source;

wherein the control module is coupled with the first power line of the first power source and the second power line of the first power source, wherein a third terminal of the control module is directly connected to the voltage division terminal of the detection module, wherein the control module comprises two inverters respectively connected between the first and second power lines of the first power source, the two inverters respectively comprising a first pair of transistors with opposite polarities and a second pair of transistors with opposite polarities, gates of the first pair of transistors serves as the third terminal of the control module, and drains of the first pair of transistors are directly connected to gates of the second pair of transistors and drains of the second pair of transistors serve as a fourth terminal of the control module to be directly connected to the clamping module.

* * * * *